United States Patent
Monks et al.

(10) Patent No.: US 8,380,160 B2
(45) Date of Patent: Feb. 19, 2013

(54) METHOD AND APPARATUS FOR ENHANCED SAFETY IN A PUBLIC SAFETY COMMUNICATION SYSTEM

(75) Inventors: Deborah J. Monks, Palatine, IL (US); Alejandro G. Blanco, Davie, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 341 days.

(21) Appl. No.: 12/749,248

(22) Filed: Mar. 29, 2010

(65) Prior Publication Data

US 2011/0237217 A1   Sep. 29, 2011

(51) Int. Cl.
*H04M 11/04* (2006.01)

(52) U.S. Cl. ..................... 455/404.1; 370/261

(58) Field of Classification Search ............... 455/404.1; 370/338
See application file for complete search history.

(56) References Cited

U.S. PATENT DOCUMENTS

| | | |
|---|---|---|
| 5,045,839 A | 9/1991 | Ellis et al. |
| 5,179,721 A | 1/1993 | Conroe et al. |
| 6,496,508 B1 | 12/2002 | Breuckheimer et al. |
| 7,103,890 B2 | 9/2006 | Bush |
| 7,382,247 B2 | 6/2008 | Welch et al. |
| 7,610,354 B2 | 10/2009 | Adams et al. |
| 7,613,721 B2 | 11/2009 | Horvitz et al. |
| 7,613,773 B2 | 11/2009 | Watt |
| 7,617,328 B2 | 11/2009 | Lewis et al. |
| 7,624,189 B2 | 11/2009 | Bucher |
| 7,624,421 B2 | 11/2009 | Ozzie et al. |
| 2004/0037243 A1 | 2/2004 | Inoue et al. |
| 2004/0054597 A1 | 3/2004 | Gulliver et al. |
| 2004/0068551 A1 | 4/2004 | Hymel et al. |
| 2004/0203978 A1 | 10/2004 | Wong et al. |
| 2004/0261126 A1 | 12/2004 | Addington et al. |
| 2005/0265256 A1 | 12/2005 | Delaney |
| 2007/0211866 A1 | 9/2007 | Sink |
| 2008/0098454 A1 | 4/2008 | Toh |
| 2009/0160641 A1* | 6/2009 | Stanners et al. ......... 340/539.13 |
| 2009/0207768 A1 | 8/2009 | Wang et al. |
| 2009/0280771 A1 | 11/2009 | Bolin |
| 2010/0279647 A1* | 11/2010 | Jacobs et al. ............... 455/404.1 |

FOREIGN PATENT DOCUMENTS

| | | |
|---|---|---|
| EP | 1768323 A1 | 3/2007 |
| EP | 1768436 A2 | 3/2007 |
| EP | 1928161 A1 | 6/2008 |
| GB | 2423888 A | 9/2006 |
| WO | 2008027750 A2 | 3/2008 |
| WO | WO 2008027750 A2 * | 3/2008 |

OTHER PUBLICATIONS

Korean Intellectual Property Office (KIPO) Notice of Preliminary Rejection (Translation)—mailed Dec. 30 2009—3 pages.

(Continued)

*Primary Examiner* — Marcos Batista
(74) *Attorney, Agent, or Firm* — Barbara R. Doutre; Valerie M. Davis; Kenneth A. Haas (57) ABSTRACT

A communication system (100) provides collaboration amongst a plurality of communication devices (110, 112, 114, 116, 120) during emergency conditions. Emergency trigger(s) are used to detect an emergency condition. Emergency information is collected and can be shared and appended amongst the communication devices prior to the emergency information being transferred in a redundant manner across a plurality communication systems (140, 142) to a plurality of external devices (130, 144, 146).

14 Claims, 4 Drawing Sheets

OTHER PUBLICATIONS

Sumit Roy et al "Capacity Scaling with Multiple Radios and Multiple channels in Wireless Mesh Networks"—IEEE WiMesh, Sep. 2005—10 pages.
PCT International Search Report Dated Apr. 20, 2011.
PCT International Search Report Dated Mar. 21, 2011 for Related U.S. Appl. No. 12/749,142.
PCT International Search Report Dated Apr. 19, 2011 for Related U.S. Appl. No. 12/749,194.
Final Office Action mailed on Jun. 22, 2012 in U.S. Appl. No. 12/749,194, David E. Klein, filed Mar. 29, 2010.
Non Final Office Action mailed on Apr. 30, 2012 in U.S. Appl. No. 12/749,194, David E. Klein, filed Mar. 29, 2010.
International Preliminary Report on Patentability and Written Opinion for International Patent Application No. PCT/US2010/060922 issued on Oct. 2, 2012.
International Preliminary Report on Patentability and Written Opinion for International Patent Application No. PCT/US2010/060961 issued on Oct. 2, 2012.
International Preliminary Report on Patentability and Written Opinion for International Patent Application No. PCT/US2010/061214 issued on Oct. 2, 2012.
Non Final Office Action mailed on Oct. 25, 2012 in U.S. Appl. No. 12/749,142, David E. Klein, filed Mar. 29, 2010.

\* cited by examiner

METHOD AND APPARATUS FOR ENHANCED SAFETY IN A PUBLIC SAFETY COMMUNICATION SYSTEM

CROSS REFERENCE TO RELATED APPLICATIONS

This application is related to co-pending U.S. patent application Ser. No. 12/749,194 and Ser. No. 12/749,142, filed concurrently herewith and commonly assigned to Motorola, Inc.

FIELD OF THE DISCLOSURE

The present disclosure relates generally to communication systems, and more particularly, to the enhancement of mission and business critical communication systems through the provision of enhanced emergency and back-up request capability using a plurality of communication devices.

BACKGROUND

Public safety personnel, such as police officers, firefighters, paramedics and the like, as well as business critical users such as manufacturing, hospital, and public service workers typically utilize multiple communication devices. While some of these devices may operate on government or enterprise networks with emergency features, others may not.

Public safety communication devices include, for example, mobile radios such as handheld radios and/or vehicular radios along with remote accessories, such as remote microphones, speakers, earpieces, headsets and the like. This type of equipment (considered primary mission critical devices) and the infrastructure to support its operation is typically accomplished utilizing a Private Network governed by a public safety agency. Primary devices for use in mission critical applications often include a user interface having an emergency button for transmitting an emergency alert notification as well as push-to-talk (PTT) capability which allows a worker to request additional back-up resources in high stress situations.

The additional non public safety types of devices often utilized by public safety personnel are considered non-mission critical devices, such as cell phones, personal digital assistants, electronic notepads which operate over a Public Carrier network. These secondary, non-mission critical devices do not provide a user interface for high stress emergency environments.

Public safety personnel often call upon back-up resources in a dangerous situation. However, when PTT voice requests for back-up resources are communicated over a radio system or cellular network, requests may not be heard by dispatchers or work partners due to coverage holes, network congestion, talk-over, or work partner task focus. The public safety worker who presses the emergency button or push-to-talk button to request back-up may not be able to readily repeat the request when operating in a high stress situation. Additionally, the public safety worker may not be aware that the request has failed, further jeopardizing safety.

Accordingly, there is a need for an improved communication system which will enhance emergency and back-up requests in public safety applications.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Before describing in detail embodiments that are in accordance with the present invention, it should be observed that the embodiments reside primarily in combinations of apparatus components and method steps related to the enhancement of a mission or business critical communication system. While the communication system provided herein applies to a variety of users that carry multiple devices, public safety examples will be used to illustrate various embodiments of the invention.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
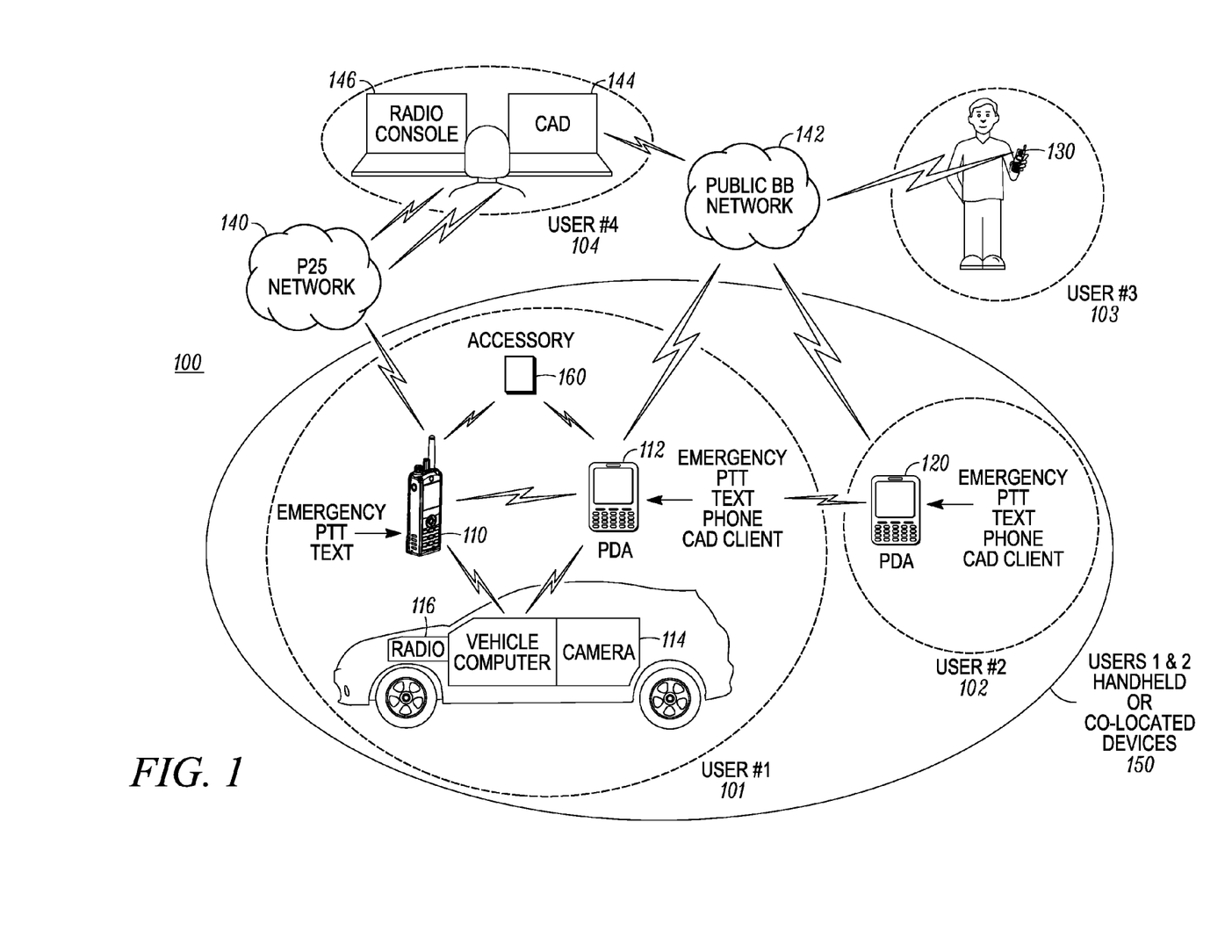
FIG. 1 is a diagram of a communication system formed and operating in accordance with an embodiment of the invention.

FIG. 1 is a diagram of a communication system 100 formed and operating in accordance with an embodiment of the invention. Communication system 100 comprises a plurality of communication devices 110, 112, 114, 116, 120, 130 shown operating under a plurality of different wide area communication networks shown as P25 network 140 and public broadband network 142. A computer aided dispatch (CAD) center 144 and radio console 146 communicate with the plurality of communication devices 110, 112, 114, 116, 120, and 130 over the wide area networks 140, 142. The communication system 100 may be utilized by a single user 101 and/or co-located user 102 and further with external users 103, 104. Communication devices are shown as a radio 110, PDA 112, vehicular computer with camera 114, vehicular radio 116, and accessory 160, and these communication devices are under the control of first user 101. Communication device 120 is shown as a PDA under the control of second user 102. Communication device 130 is shown as a cell phone under the control of third user 103. In accordance with the embodiment, communication devices under the control of first user 101 and second user 102 are operating within a personal area network (PAN) 150 while third user 103 is using communication device 130 outside of the PAN 150. The CAD center 144 and radio console 146 are outside of the PAN 150 and are under the control of a dispatcher, fourth user 104.

In accordance with the embodiment, the plurality of devices 110, 112, 114, 116, 120, 130 have an emergency application stored therein that provides collaborative operation amongst the devices when they are within range of the personal are network (PAN) 150. As such, in FIG. 1 third user 103 is currently shown out of the PAN area 150, however communication device 130 is still in communication via the public broadband network 142.

In accordance with the embodiment of FIG. 1, at least one communication device, here communication device 110, comprises a two-way radio with push-to-talk (PTT) and text messaging capability operating over a narrowband network, such as the P25 network 140. At least one other communication device 120, shown as a personal digital assistant (PDA), operates over the public broadband network 142 and provides emergency, PTT, text messaging, telephony, and client computer aided dispatch (CAD)/mobile client features.

In accordance with an embodiment, at least one of the plurality of communication devices comprises an emergency detection feature triggered by, for example: an input display, a keypad, an emergency alert button, voice recognition, emergency sensor, accelerometer, mercury switch man-down detection, and/or biometrics via an accessory. For the purposes of example, the two-way radio 110 is shown to include emergency button and PDA 120 is shown to include emergency button. It should be noted that while both devices 110, 120 have a collaborating emergency application, only one device needs the emergency detection capability.

Additional devices operating within the P25 network 140 may include for example a server, additional computer-aided dispatch (CAD) consoles, additional radio consoles, and/or other two-way radios to name a few. Additional devices operating within broadband network 142 may include other data devices having text messaging, client consoles, such as computer aided condole dispatch (CAD) console, telephony devices, such as cellular device 130 utilized by independent user 103 and PTT devices to name a few. Additional communication devices, such as an accessory device 160 may also form part of the plurality of communication devices to operate with communication devices communication devices 110, 112, and 114. For the purposes of the description of FIG. 1, cell phone 130, CAD console 144, and radio console 146 are considered external to PAN network 150 and may also be referred to as a plurality of external communication devices. Additional elements (not shown) may also be operating within the PAN network 150, for example a mobile CAD console within the vehicle.

In accordance with the embodiment of FIG. 1, the plurality of communication devices 110, 112, 114, 116, 120, 160 operate over the personal area network (PAN) 150. The PAN operates simultaneously with the wide area network (WAN) of P25 network 140 and public broadband network 142. Pairing of the plurality of devices with PAN initiation can, for example, be initiated at the commencement of a user's shift and operate continuously. In accordance with the embodiment, the plurality of communication devices 110, 112, 114, 116, 120 collaborate over the PAN 150 and reconfigure each other to operate in an emergency mode of operation in response to the emergency condition being detected. When an emergency condition has been detected at radio 110, for example if PTT voice communication fails to result in a successful communication or if an emergency button press fails to result in a successful communication, then the radio 110 instructs the PDA 112 to operate in an emergency mode of operation and transfers emergency content to the PDA 112 so that PDA 112 can initiate a new communication using the emergency content using the same or alternative communication type. PDA 112 can, for example, transfer the emergency content to other devices, such as PDA 120, CAD console 144. CAD console 144 can in turn transfer the emergency content throughout the networks, such as for example to external communication device 130 of third user 103.

In another embodiment, if the emergency mode originates at the PDA 112 then the PDA automatically notifies the radio 110 to enter an emergency mode, and PDA 112 provides emergency content information to radio 110. Radio 110 then operates as though as though its' emergency button or PTT button was pressed, sending the emergency content received from the PDA 112 has a PTT voice communication.

In accordance with an embodiment at least one of the plurality of communication devices 110, 112 provides emergency detection and emergency notification to other communication devices within communication system 100. During the collaborative mode of emergency operation, emergency information is collected, shared and appended amongst the plurality of communication devices and then transmitted across the plurality of different communication networks 140, 142 thereby providing redundant emergency transmissions over the plurality of networks and/or communication types. As mentioned before, accessory 160 may be included and used to transfer the emergency information amongst the plurality of communication devices over the PAN 50. Redundant transmission of emergency information ensures that all back-up personnel associated with the user are notified of emergency conditions, including users of radio console 146, CAD console 144, telephony, the user's PTT talk group members, text messaging clients, email clients, and/or mobile data clients. As such, communication devices external to PAN 150, such as computer aided dispatcher (CAD) consoles 144, radio computer consoles 146 and other external devices operating within the different communication networks 140, 142 can be updated in parallel via the redundant transmissions.

In accordance with an embodiment, reconfiguration of the plurality of communication devices are preconfigured by the collaborating emergency applications. The collaborating emergency applications can be embedded in the devices 110, 112, 114, 116, 120, 130 or added as a user application. This emergency application can be a separate application or deployed as part of a CAD/mobile client or PTT client running in the device. However, once the client is deployed, the user or a system administrator may configure in accordance with business rules enacted by the client. For example, an officer might configure the emergency application to take the emergency content generated by PTT calls in the radio 110, and send a text message to all members of their PTT talk group with the same content. They may also allow a dispatch operator or supervisor to upload officer location and sensor data when in emergency mode. Business rules may also be set to put the PDAs 112, 120 in a speakerphone and auto-answer mode, or to have the PDA application request higher levels of network service, if this feature is supported on networks used.

The emergency information captured by the emergency application may comprise for example: voice clips, location information, sensor data, and text, collected by at least one of the plurality of communication devices. In accordance with a PTT embodiment, emergency information can take the form of emergency voice PTT information collected at a microphone of radio 110 and PDA device 112. For example, the microphone may be used to collect voice communication in response to the PTT button being pressed. When the PTT button is pressed, voice information is stored in a circular buffer. If an emergency is detected, this voice buffer is treated as emergency content. The PTT information will be treated as emergency information if an emergency is detected. On the PDA or even the radio, audio can constantly be stored in a circular buffer, even if the user is not on a "call". The buffer can then be used as emergency content if an emergency is detected.

Information for dissemination amongst the plurality of external communication devices, 130, 144, 146 can occur in at least two ways, such as two PTT applications collaborating in an emergency mode, and by taking voice clips from one device and initiating a new PTT in a second device with the voice clip, or autonomous emergency applications running in each device for purposes of exchanging emergency content that, in turn interface with other applications in their respective devices, converting content to a form suitable for other applications as necessary.

The emergency voice PTT information can be converted by the emergency application into a combination of data (e.g. text messages) and/or voice clips which are transmitted to other communications devices using non-PTT communication. Non-PTT communication may comprise for example, short text message service (SMS) message, telephone call, CAD/mobile client message, multi-media message service (MMS) or other non-PTT communication means.

During the collaborative mode of operation, the plurality of communication devices 110, 112, 114, 116, 120 may also append the emergency information received from a collaborating device with location, image, sensor, photo, audio log, last call, incident assignment information or other emergency information pertaining to the user prior to transmitting the emergency information to the other communication devices.

As an example, consider a police officer (e.g. first user 101) in the field pressing the PTT button on radio 110. The officer speaks into the microphone stating his emergency condition, for example "I need back up—have three gang members with weapons!!" The radio emergency application operating in accordance with this embodiment detects that the communication failed (e.g. the unit was out of coverage, or the user was talked over within the APCO 25 system) and that this is an emergency communication. The radio emergency application notifies PDA 112 which allows the emergency mode to activate and the radio 110 sends out relevant emergency information to PDA 112. The relevant emergency information content may take on the form of voice clip, GPS data, sensor data and the like as described above.

Continuing with the example, the PDA 112 automatically and periodically dials a phone call to the officer's supervisor, such as third user 103. The call content includes the following programmed voice communication "Officer Smith has requested back-up, but his communication was blocked. Officer Smith stated "I need back up—have three gang members with weapons."" The call content can further include voice location information based on GPS coordinates generated in radio 110 or PDA 112 and translated to voice in the PDA 120. For example, the call content can include "Officer Smith is located SW 4th Street and 75$^{th}$ avenue."

Additionally, the call content can include information pertaining to the background noise surrounding one of the communication devices. For example, if gunshots were detected by the radio 110 or PDA 112 then the call content might further include "Gun shots have been detected." as a voice clip generated from the emergency application.

The dispatcher can continue to listen to the officer's surroundings and speak to the officer via the PDA's speaker which would have been automatically activated in response to the emergency mode of activation. Text messages can also be sent to everyone on the current talk group with the same information.

The emergency mode will conclude when a satisfactory response is generated. A satisfactory response may be that the call is answered or that the PDA 112 receives and answers a return call from a supervisor (for example third user 103 or dispatcher 144). The satisfactory response is then communicated to the radio emergency application.

As another example, consider a police officer pressing the emergency button on PDA 112 and stating "Need back up—have three gang members with weapons!!" In response to the emergency button being pressed at PDA 112, a PDA emergency application of PDA 112 is enabled which notifies radio 110 to enable its radio emergency application. Alternatively, the emergency button may also be located on a wearable accessory, such as accessory 160 (shared by both communication devices 110, 112), and may include a sensor, or be analytics driven. Once the PDA emergency application is activated and relevant emergency information content (for example: voice clip, GPS data converted to voice, sensor data converted to voice to name a few) is transferred to the radio emergency application. The officer's buffered/stored voice is then transmitted from the radio 110 as a PTT voice communication and radio emergency functionality is invoked—as though the emergency button on radio 110 had been pressed.

Follow-on voice communications may also be provided by using a microphone input of the PDA 112, with "virtual" PTT button depression based on voice recognition software in the PDA 112 that senses when the officer is speaking, stores the content and forwards the content as data (or voice) to the PTT radio 110, for radio transmission. Hence, every time the user's voice is detected when in an emergency mode, the microphone would capture the voice and put in buffer, then the emergency application would initiate a PTT or other communication with the user's voice, along with a preface if desired.

Figure 2:
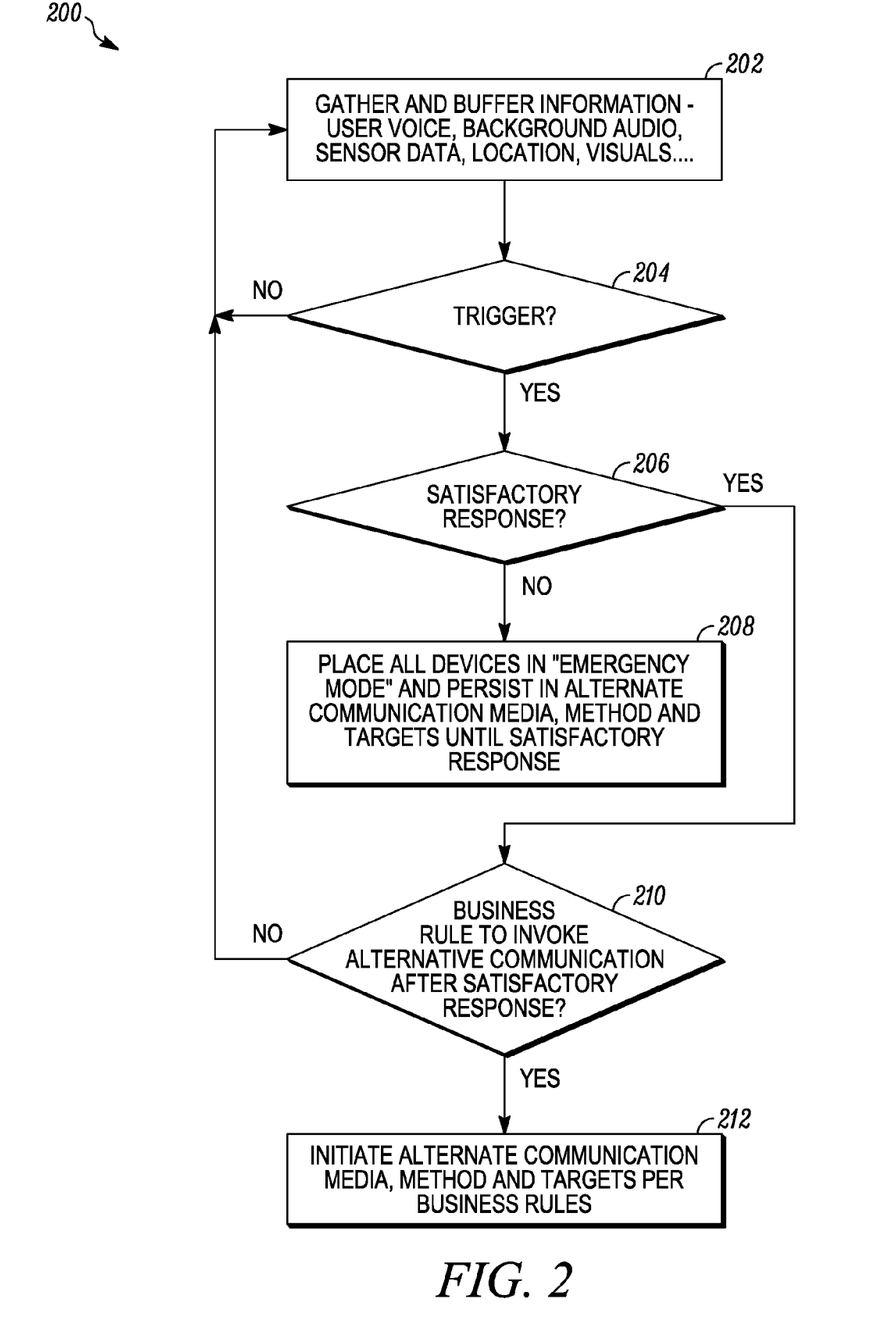
FIG. 2 is a flowchart example of how the communication system operating in accordance with an embodiment of the invention enters into predetermined modes of operation.

Referring to FIG. 2, there is shown a flowchart 200 providing an example of how the communication system operating in accordance with an embodiment of the invention enters into predetermined modes of operation. Briefly, in accordance with this embodiment the predetermined operating modes comprises the emergency mode of operation or an alternate communication mode entered into based on predetermined business rules. Entering into either of the two modes of operation is based on gathering context information surrounding the plurality of communication devices, receiving a trigger, and receiving a satisfactory or unsatisfactory response to the trigger.

Beginning at 202, context information currently associated with at least one of the communication devices (such as devices 110, 112) is gathered and temporarily stored or buffered. The gathered context information may be in the form of user voice, background audio, sensor data, location, visuals or any other context type information. For example, sensor data can be acquired using a variety of sensor types including environmental sensors, motion sensors, biometric sensors and the like. The content of the context information is examined to determine whether an emergency condition exists, thereby triggering an emergency detection response at 204. Alternatively, a trigger at 204 can be initiated based on an emergency button press or PTT press from either device.

At 206 a response check is made to indicate whether an emergency condition has been satisfactorily resolved. A response check may request user action that indicates the emergency condition has been resolved or was an error. If an unsatisfactory response is received at 206, then the plurality of communication devices 110, 112, 114, 116, 120 and 160 are placed into the emergency mode of operation at 208. The plurality of communication devices will remain in the emergency mode of operation until a satisfactory response is received. Examples of a satisfactory response include for example, a call being answered by radio 110 or the PDA 112 receiving and answering a return call from a supervisor or dispatcher.

During the emergency mode of operation, the plurality of communication devices operate in the collaborative manner previously described. A satisfactory response at 206 indicates that no emergency condition exists, and a decision is made as to whether to invoke an alternative communication based on predetermined business rules at 210. If the decision to invoke an alternate communication is made at 210, then the alternate communication is invoked at 212.

Figure 3:
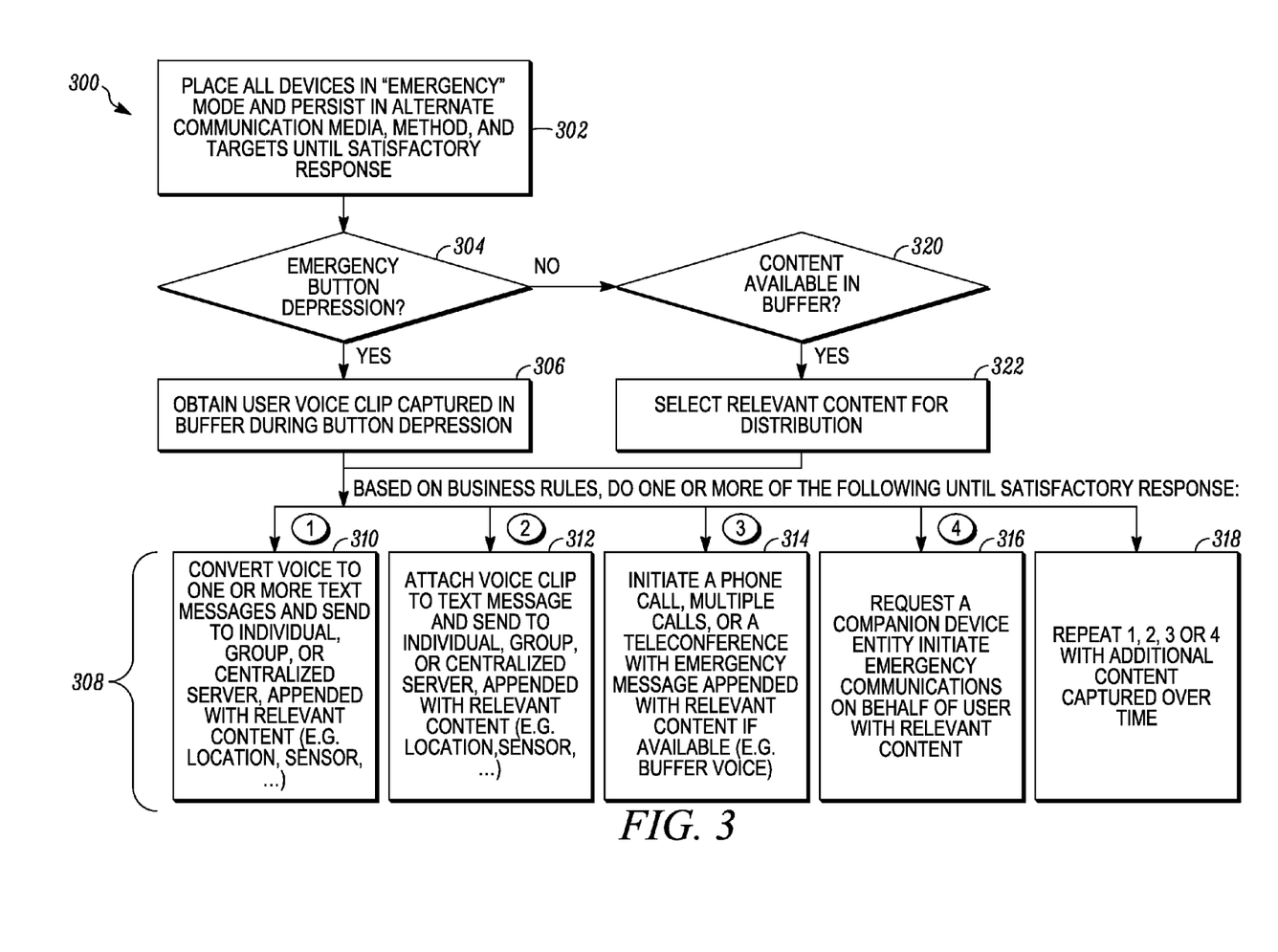
FIG. 3 is a flowchart example of content distribution during an emergency mode of operation in accordance with an embodiment of the invention.

FIG. 3 is a flowchart 300 providing an example of content distribution during an emergency mode of operation in accordance with an embodiment of the invention. Step 302 is the equivalent of 208 from FIG. 2 in which all communication devices are placed in the emergency mode of operation. If an emergency button press or other emergency indicator is not detected at 304, the content of the buffer is checked at 310 and relevant information is selected and distributed amongst the communication devices at 312. If an emergency button press is detected at 304, then emergency information, for example in the form of a user voice clip is obtained from the buffer.

In accordance with an embodiment, once the emergency information is ready for distribution from either 306 or 312, then transmission of the relevant emergency information to an individual or group is based on predetermined business rules. For example, referring to 308, a voice clip can be associated with text, such as by converting the voice clip to text or attaching the voice clip to a text message. The types of additional information that can be attached to the text message include for example, location, sensor data or other context information. Distribution of relevant emergency information may occur by initiating a phone call using the buffered relevant emergency information. The transmission of relevant emergency information may also include requesting a companion device to initiate emergency communications using the relevant emergency information.

Again, by sharing and appending the emergency information amongst the plurality of communication devices prior to or in conjunction with the emergency information being transmitted over the multiple networks and various communication types facilitates parallel propagation of relevant emergency information. The redundancy provided by propagating relevant emergency information in a parallel manner enhances the safety and security of individuals working within the system.

Figure 4:
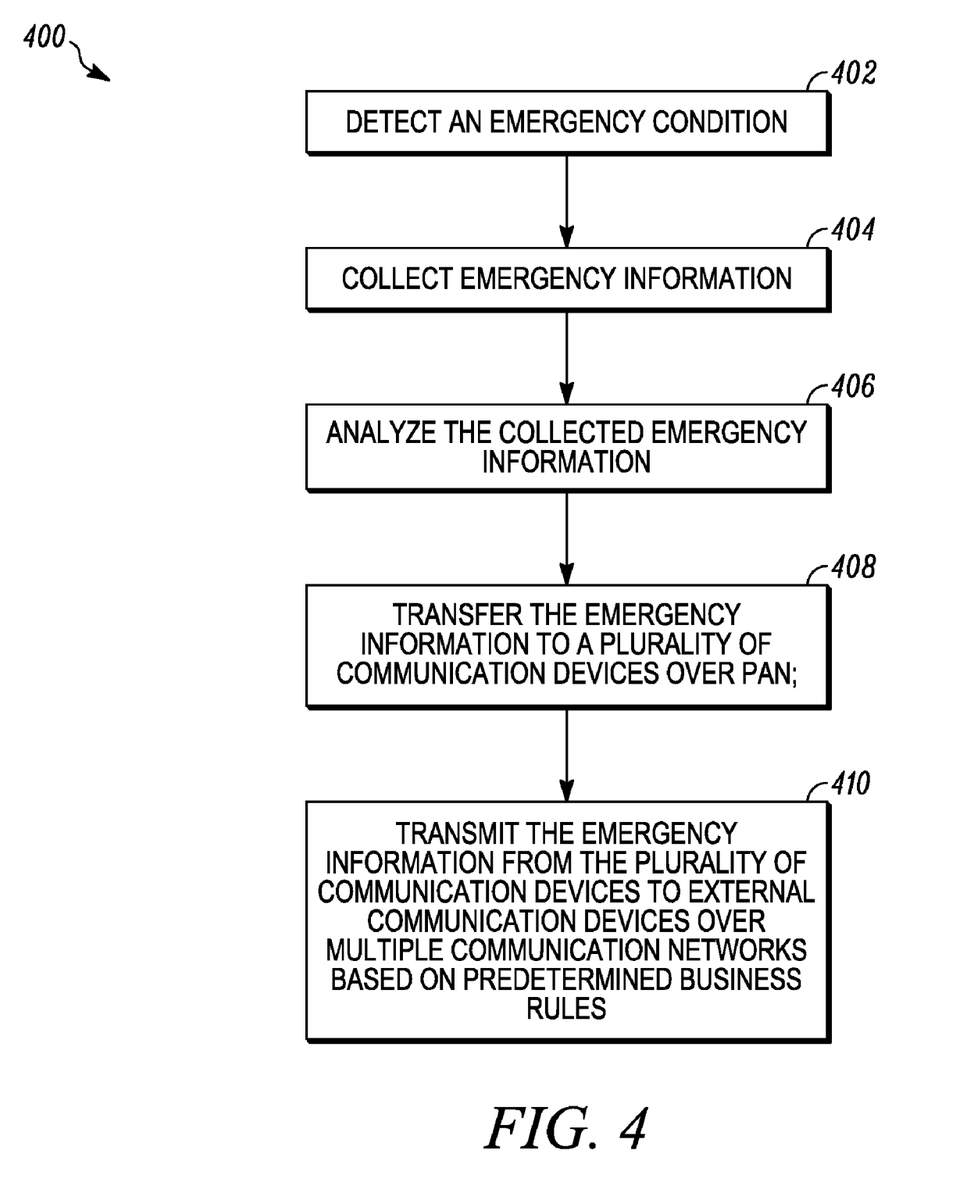
FIG. 4 is a flowchart example summarizing enhanced emergency information distribution in accordance with an embodiment of the invention.

FIG. 4 is a flowchart example summarizing the enhanced emergency information distribution in the communication system in accordance with an embodiment of the invention. Step 402 begins by detecting an emergency condition (based on PTT or emergency button press) at a communication device, followed by 404 with collecting emergency information pertaining to the emergency condition. The collected emergency information is analyzed at 406 to determine relevant emergency information. The relevant emergency information is transferred to a plurality of communication devices over a personal area network at 408.

As an alternative, steps 402 and 404 can be interchanged if the emergency application downloaded into the communication device initiates gathering context information (for example sensor data as was described back in step 202 and/or camera data as seen in FIG. 1) prior to the detection of an emergency trigger.

Moving to 410, the relevant emergency information is transmitted from the plurality of communication devices to external communication devices over multiple communication networks as a new communication session, thereby propagating redundant transmission of the emergency information. The propagation of the relevant emergency information and communication types (e.g. phone call, text message, PTT call) employed is based on predetermined business rules. The relevant emergency information can be shared, appended to, and added to by all collaborating devices as provided by the predetermined business rules. Once a satisfactory response is detected by any of the collaborating devices, the other devices at notified and all devices go back into standard operating modes.

Accordingly, there has been provided a communication system with enhanced safety by providing redundant propagation of emergency information across a plurality of devices and across a plurality of communication systems. Public safety workers can better manage, coordinate and utilize their communication devices due to the collaboration provided by the emergency mode of operation. The automatic transfer of relevant emergency information allows work partners and external systems to better monitor conditions and track public service personnel working in dangerous environments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject Those skilled in the art will appreciate that the above recognized advantages and other advantages described herein are merely exemplary and are not meant to be a complete rendering of all of the advantages of the various embodiments of the present invention.

We claim:

1. A communication system, comprising:
    first and second communication devices operating on first and second communication networks respectively and utilized by the same or co-located users, the first and second communication devices also operating over a personal area communication network, the first and second communication devices collaborating over the personal area network to reconfigure each other to operate in an emergency mode of operation in response to an emergency condition being detected by either the first or second communication device;
    wherein at least one of the first and second communication devices comprises an emergency detection feature for collecting emergency information and transferring the collected emergency information amongst the first and second communication devices; and wherein at least one of the first and second communication devices transmits the emergency information redundantly via a text message to members of a PTT talk group as new communication to a plurality of external devices operating over different networks;
    wherein reconfiguration of the first and second communication device emergency mode operating parameters are preconfigured by first and second embedded applications associated with the first and second devices;
    wherein a voice buffer is activated: by a push-to-talk (PTT) button, by an emergency button, operated continuously, or triggered by another emergency detection mechanism, the voice buffer for collecting voice communication and providing the collected voice communication via a text message as emergency information for dissemination amongst the plurality of communication devices.

2. The communication system of claim 1, wherein the emergency detection feature located on at least one of the first and second communication devices comprises an emergency button.

3. The communication system of claim 1, wherein the emergency information comprises emergency voice push to talk (PTT) information collected at a microphone of at least one of the first and second communication devices, the emergency voice PTT information being converted into a combination of data and voice clips which are then transmitted to other communications devices using non-PTT communication through one of the first and second devices.

4. The communication system of claim 3, wherein the non-PTT communication comprises data communication over at least one of a data connection or telephony connection.

5. The communication system of claim 3, wherein the second communication device generates a text message and appends the text message and voice clips with location or other emergency information pertaining to the user of the first communication device prior to transmitting to the other communication devices.

6. A method of communicating an emergency condition amongst a plurality of communication devices, comprising:
    communicating between at least two of the plurality of communication devices over a personal area network (PAN), the at least two communication devices also communicating over a wide area network (WAN) to other communication devices;
    detecting an emergency condition by at least one of the at least two communication devices;
    collecting emergency information pertaining to the emergency condition;
    analyzing the collected emergency information at the communication device to determine relevant emergency information;
    activating a voice buffer by push-to-talk (PTT) button, by an emergency button, operated continuously, or triggered by another emergency detection mechanism, the voice buffer for collecting voice communication and providing the collected voice communication via a text message as relevant emergency information for dissemination amongst the plurality of communication devices;
    transferring the relevant emergency information via a text message to a plurality of communication devices over a personal area network; and
    transmitting the relevant emergency information from the plurality of communication devices to external communication devices over multiple communication networks and communication types to provide redundant transmission of the emergency information.

7. The method of claim 6, further comprising the step of buffering the relevant emergency information.

8. The method of claim 7, wherein buffering the relevant information comprises buffering the relevant information before the emergency condition is detected.

9. The method of claim 8, wherein the relevant emergency information is buffered before an emergency condition is detected according to business rules, by selecting predetermined emergency content and buffering continuously, such that the relevant emergency information is shared when emergency conditions are detected.

10. The method of claim 7, wherein buffering the relevant emergency information, comprises:
    receiving audio at a microphone; and
    buffering at least a portion of the received audio as a voice clip; and
    converting the voice clip to text and attaching the converted voice clip to a text message;
    transmitting the voice clip as a text message in response to an emergency trigger.

11. The method of claim 6, wherein transmitting the relevant emergency information comprises initiating a phone call using the relevant emergency information.

12. The method of claim 6, transmitting the relevant emergency information further includes requesting a companion device to initiate emergency communications using the relevant emergency information.

13. The method of claim 6, wherein collecting emergency information further comprises:
    sharing and appending the emergency information amongst the plurality of communication devices prior to the emergency information being transmitted over the multiple networks.

14. The method of claim 6, wherein the step of detecting an emergency condition comprises, determining a failed PTT communication or an emergency button press by at least one of the at least two of the plurality of communication devices.

* * * * *

UNITED STATES PATENT AND TRADEMARK OFFICE
CERTIFICATE OF CORRECTION

PATENT NO. : 8,380,160 B2
APPLICATION NO. : 12/749248
DATED : February 19, 2013
INVENTOR(S) : Monks et al.

It is certified that error appears in the above-identified patent and that said Letters Patent is hereby corrected as shown below:

On the Title Page, in Item (57), under "ABSTRACT", in Column 2, Line 8, delete "plurality" and insert -- plurality of --, therefor.

In the Specification

In Column 3, Line 2, delete "personal are network (PAN)" and insert -- personal area network (PAN) --, therefor.

In Column 9, Line 15, delete "subject" and insert -- subject. --, therefor.

Signed and Sealed this
First Day of October, 2013

Teresa Stanek Rea
*Deputy Director of the United States Patent and Trademark Office*